(12) United States Patent
Heo et al.

(10) Patent No.: US 9,496,563 B2
(45) Date of Patent: Nov. 15, 2016

(54) SLIP SHEET FOR FUEL CELL STACK

(71) Applicants: Hyundai Motor Company, Seoul (KR); Kia Motors Corporation, Seoul (KR)

(72) Inventors: Seong Il Heo, Gyeonggi-do (KR); Yoo Chang Yang, Gyeonggi-do (KR); Jun Ho Jang, Gyeonggi-do (KR); Chi Seung Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 188 days.

(21) Appl. No.: 13/828,594

(22) Filed: Mar. 14, 2013

(65) Prior Publication Data

US 2014/0170386 A1     Jun. 19, 2014

(30) Foreign Application Priority Data

Dec. 13, 2012   (KR) .................... 10-2012-0145785

(51) Int. Cl.
  *B32B 3/02*     (2006.01)
  *B32B 3/30*     (2006.01)
  *H01M 8/02*    (2016.01)

(52) U.S. Cl.
  CPC ......... *H01M 8/0297* (2013.01); *H01M 8/0247* (2013.01); *Y02E 60/50* (2013.01); *Y10T 428/24479* (2015.01)

(58) Field of Classification Search
  CPC ........... H01M 8/0297; H01M 8/0247; H01M 8/0256; H01M 8/249; H01M 8/2495; Y10T 428/24025; Y10T 428/24628; Y10T 428/24669; Y10T 428/24694; Y10T 428/24479; Y10T 428/24537; Y10T 428/2457; Y10T 428/24942; Y10T 428/2495
  USPC ........ 428/101, 114, 156–160, 163, 166, 167, 428/172
  See application file for complete search history.

(56) References Cited

U.S. PATENT DOCUMENTS 6,893,765 B1 *    5/2005  Nishida et al. ............... 429/481
2006/0246331 A1 * 11/2006  Steinbroner .................... 429/23

FOREIGN PATENT DOCUMENTS

| JP | 3130802 U | 4/2007 |
|----|-----------|--------|
| KR | 10-2008-0022812 A | 3/2008 |
| KR | 10-2009-0060869 A | 6/2009 |
| KR | 10-2009-0113432 A | 11/2009 |
| KR | 10-2010-0011522 A | 2/2010 |
| KR | 10-2010-0030709 A | 3/2010 |

* cited by examiner

*Primary Examiner* — Aaron Austin
*Assistant Examiner* — Megha Gaitonde
(74) *Attorney, Agent, or Firm* — Mintz Levin Cohn Ferris Glovsky and Popeo, P.C.; Peter F. Corless

(57) ABSTRACT

A slip sheet for a fuel cell stack that includes a plurality of spaced fluid channel support protrusions protruding from a main body, at portions which face fluid channel protrusions of a separator plate in such a manner that the spaced fluid channel support protrusions come into contact with the fluid channel protrusions of the separator plate.

4 Claims, 4 Drawing Sheets

SLIP SHEET FOR FUEL CELL STACK

CROSS-REFERENCE TO RELATED APPLICATION

This application claims under 35 U.S.C. §119(a) the benefit of Korean Patent Application No. 10-2012-0145785 filed Dec. 13, 2012, the entire contents of which are incorporated herein by reference.

BACKGROUND

1. Field of the Invention

The present invention relates, in general, to a slip sheet for a fuel cell stack and, more particularly, to a technology concerning the structure of a slip sheet for a fuel cell stack, which is used to stack and store separator plates which make up the fuel cell stack 2. Description of the Related Art FIG. 1 illustrates the shape of a separator plate 500 for a fuel cell stack according to a related art. The separator plate 500 has a channel unit 502 in a center portion and gaskets 504 in periphery portions.

FIG. 2 is a cross-sectional view of the separator plate 500, taken along a line II-II in FIG. 1, and FIG. 3 illustrates a state of the separator plates 300. When the separator plates 500 are stored in a stacked state for a long period of time, the gaskets 504 are likely to stick to each other at the contact points. In this case, it becomes difficult to separate the separator plates 500 from each other.

To solve such a problem, as illustrated in FIG. 4, there is a known method in which the separator plates 500 are stacked with a slip sheet 506 provided therebetween. This method, however, is not without its own problems. That is, even when this method is applied, at the time of separating the separator plates 500 from each other, the separator plate 500 under the slip sheet 506 may be lifted along with the slip sheet 506 because it sticks to the slip sheet 506.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind the above problems occurring in the related art, and the present invention is intended to provide a slip sheet for a fuel cell stack which dramatically improves the effect of preventing sticking between a separator plate and a slip sheet when storing the separator plates in a stacked state. When using the slip sheet for a fuel cell stack according to the exemplary embodiment of the present invention, it is possible to minimize occurrence of the sticking between the separator and the slip sheet at the time of separating the stacked separator plates from each other, which results in improvements in smoothness and work efficiency when producing the fuel cell stack In addition, it enables a stable arrangement of the separator plates, resulting in increased stability of separator plates when stored for a long term.

In order to achieve the above object, according to one aspect of the present invention, there is provided a slip sheet for a fuel cell stack including a plurality of spaced fluid channel support protrusions, protruding from a main body, which are provided to face fluid channel protrusions of a separator plate so that the plurality of fluid channel support protrusions may come into contact with the fluid channel protrusions.

The present invention dramatically aides in preventing the sticking between a separator plate and a slip sheet when storing the separator plates in a stacked state. As a result, it is possible to minimize occurrence of the sticking between the separator and the slip sheet at the time of separating the stacked separator plates from each other, which results in improvements in smoothness and work efficiency when producing the fuel cell stack. In addition, the present invention enables a stable arrangement of the separator plates, resulting in increased stability of the separator plates when stored for a long term.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinbelow, preferred embodiments of the present invention will be described in detail with reference to the accompanying drawings.

Figure 1:
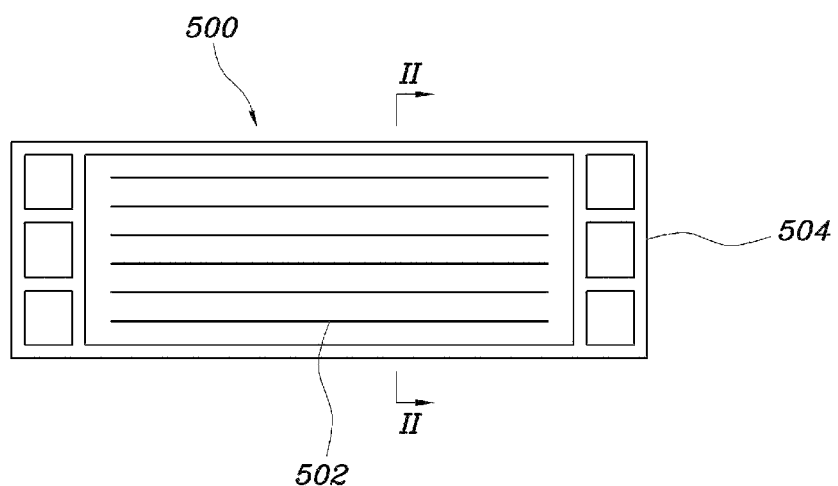
FIG. 1 is a diagram illustrating a separator plate for a fuel cell stack according to a related art.
Figure 2:
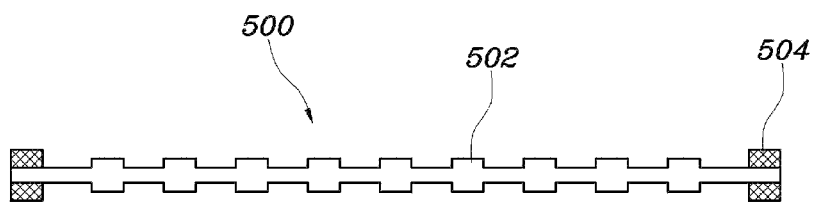
FIG. 2 is a cross-sectional view taken along a line II-II in FIG. 1.
Figure 3:
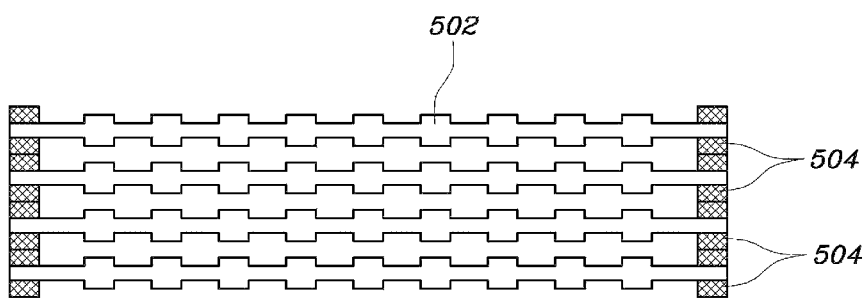
FIG. 3 is a diagram for describing the structure of the cross section of a stack of separator plates according to a related art: g
Figure 4:
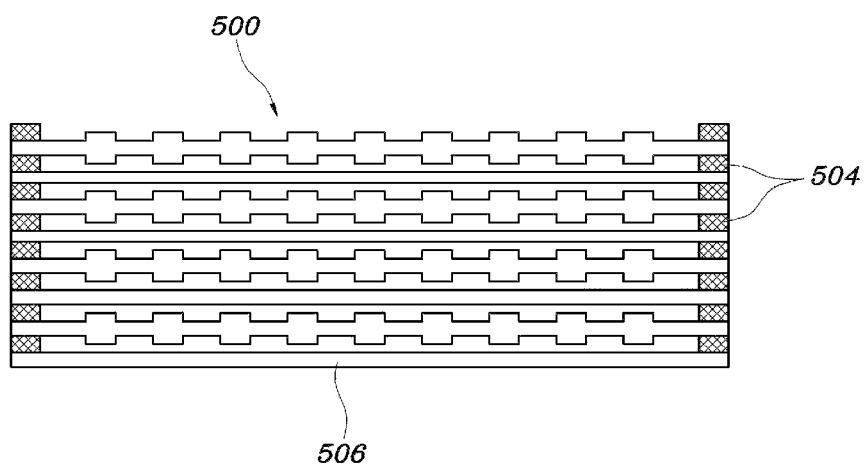
FIG. 4 is a diagram illustrating a stack of separator plates, between each one of which a slip sheet is provided.
Figure 5:
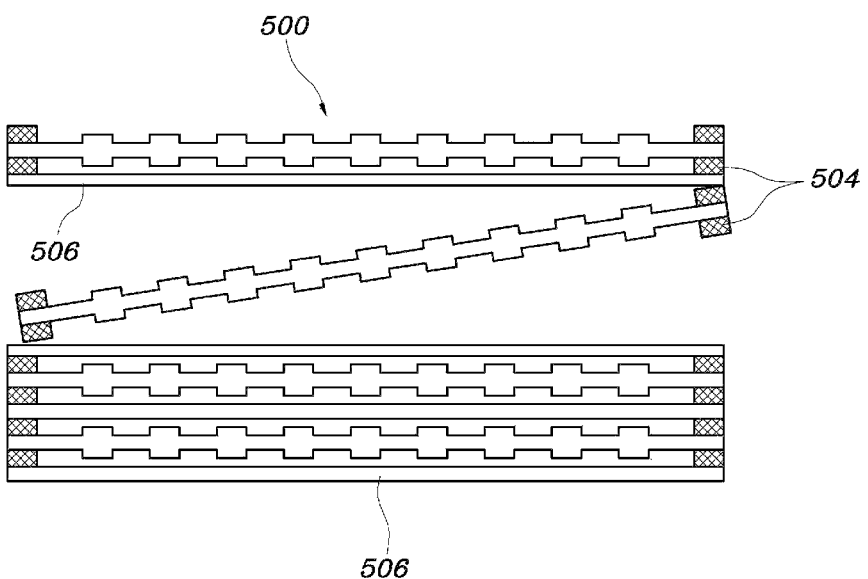
FIG. 5 is a diagram describing a sticking phenomenon which is likely to be observed when separating the stacked separator plates illustrated in FIG. 4.
Figure 6:
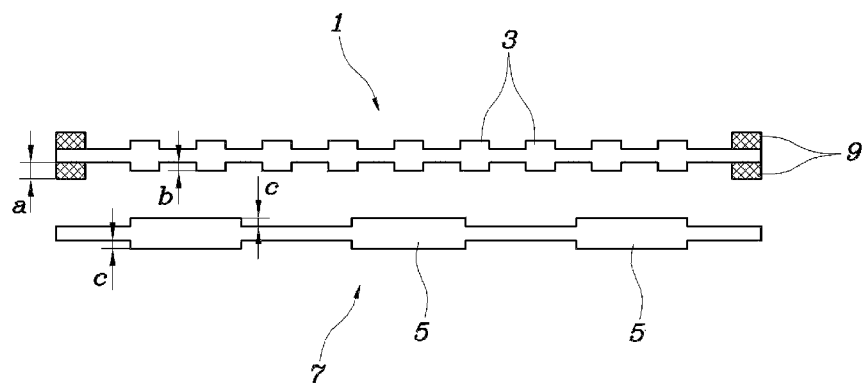
FIG. 6 is a diagram illustrating the structure of a slip sheet for a fuel cell stack according to an exemplary embodiment of the present invention.
Figure 7:
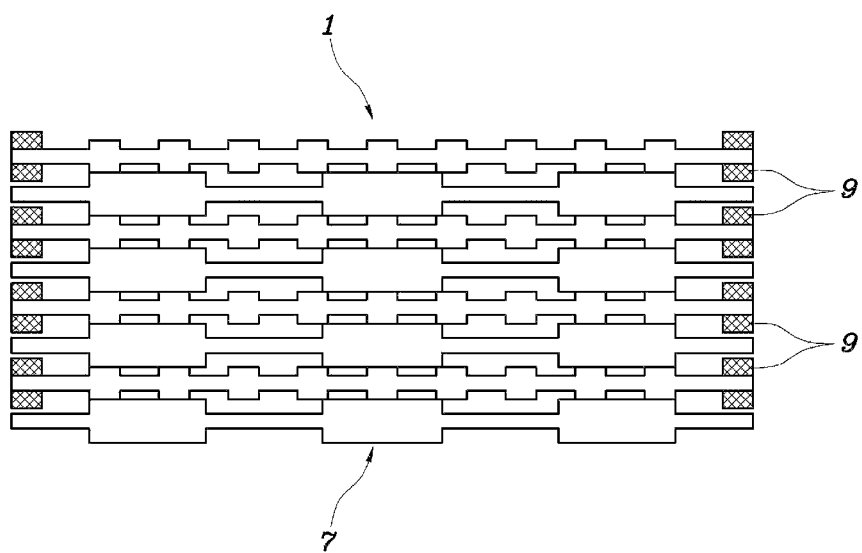
FIG. 7 is a diagram illustrating separator plates which are stacked using the slip sheet according to the exemplary embodiment of the present invention.

With reference to FIGS. 6 and 7, a slip sheet for a fuel cell stack according to one exemplary embodiment of the present invention has the structure in which a plurality of spaced fluid channel support protrusions 5, protruding from a main body, are formed to face fluid channel protrusions 3 of a separator plate 1 so that the fluid channel support protrusions 5 may come into contact with the fluid channel protrusions 3 of the separator plate 1.

That is, since the slip sheet 7 includes the fluid channel support protrusions 5 which support the fluid channel protrusions 3 of the separator plate 1, a center portion of the separator plate 1 can be supported by a center portion of the slip sheet 7. For this reason, gaps are formed between the gaskets 9 provided at outer periphery portions 9 of the separator plate 1 and the slip sheet 7 so that the gaskets 9 do not come into direct contact with the slip sheet 7. Due to the gaps, it is possible to prevent the sticking between the gaskets 9 and the slip sheet 7 from occurring.

To attain such an effect, a height "c" of the fluid channel support protrusions 5 is set to be greater than a difference between a height "a" of the gasket 9 of the separator plate 1 and a height "b" of the fluid channel protrusions 3. Therefore, when the separator sheets 1 and the slip sheets are alternately stacked as illustrated in FIG. 7, the gap is automatically provided between each of the slip sheets 7 and each of the gaskets 9 of the separator plate 1.

In addition, the height "c" of the fluid channel support protrusions 5 is preferably less than a value which is two times the height a of the gasket 9 of the separator plate 1. That is, the conditional relation "a-b<c<2a" is preferably met.

In other words, the height "c" of the fluid channel support protrusions 5 has to meet both of the following conditions: (1) the slip sheet 7 must not come into direct contact with the gasket 9; and (2) the height of the fluid channel support protrusion 5 has to be limited within a suitable range to suppress an increase in the whole volume of the stacked separator substrates 1 to as little of an extent as possible so that working efficiency and storage efficiency are not impaired.

Moreover, in terms of the lateral dimension, each of the fluid channel support protrusions 5 is preferably formed to support at least two fluid channel protrusions 3. That is, the lateral dimension of the fluid channel support protrusions 5 is set so that the fluid channel support protrusions 5 can stably support the fluid channel protrusions 3 of the separator plate 1. With this configuration, deflection of the separator plate 1 is prevented and the separator plates 2 can be stably stacked.

Figure 8:
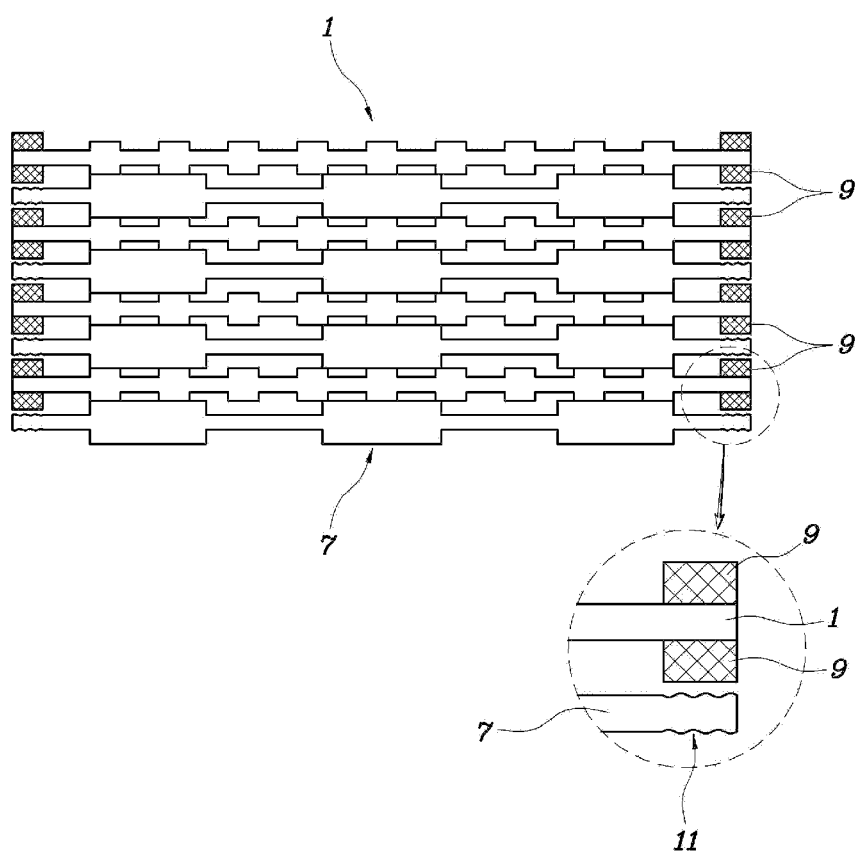
FIG. 8 is a diagram describing a slip sheet according to a modification of the present invention, and, more particularly, describing the structure of a slip sheet which has roughness at portions where gaskets are provided.

In addition, as illustrated in FIG. 8, the slip sheet has a surface roughness within a portion facing the gasket 9 of the separator plate 1. The surface roughness is provided to minimize the contact area between the slip sheet 7 and the gasket 9 so that occurrence of the sticking phenomenon may be minimized, even though the gasket 9 of the separator plate 1 deflects due to its own weight, causing the direct contact between the gasket 9 and the slip sheet 7.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A separator plate storage assembly, comprising:
    a slip sheet comprising a plurality of spaced fluid channel support protrusions protruding from a main body; and
    a separator plate, wherein the spaced fluid channel support protrusions protrude at portions which face fluid channel protrusions of the separator plate in such a manner that the spaced fluid channel support protrusions come into contact with the fluid channel protrusions of the separator plate,
    wherein a sum of a height of the fluid channel support protrusions and a height of the fluid channel protrusions is greater than a height of a gasket of the separator plate to form an empty space between the slip sheet and the gasket.

2. The separator plate storage assembly according to claim 1, wherein the height of the fluid channel support protrusion is less than a value which is two times the height of the gasket of the separator plate.

3. The separator plate storage assembly according to claim 1, having a surface roughness within a portion thereof which faces the gasket of the separator plate.

4. The separator plate storage assembly according to claim 1, wherein a size of the fluid channel support protrusion is set such that each of the fluid channel support protrusions support at least two fluid channel protrusions.

* * * * *